(12) United States Patent
Kim et al.

(10) Patent No.: US 8,963,507 B2
(45) Date of Patent: Feb. 24, 2015

(54) METHOD AND SYSTEM FOR ALLOCATING IDENTIFIERS TO MULTI-SLAVE IN BATTERY PACK

(71) Applicant: LG Chem, Ltd., Seoul (KR)

(72) Inventors: Hyun-Jin Kim, Daejeon (KR); Ju-Young Kim, Daejeon (KR); Jong-Kyung Ko, Seoul (KR); Ji-Hun Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/097,913

(22) Filed: Dec. 5, 2013

(65) Prior Publication Data

US 2014/0091769 A1 Apr. 3, 2014

Related U.S. Application Data

(63) Continuation of application No. PCT/KR2012/007129, filed on Sep. 5, 2012.

(30) Foreign Application Priority Data

Sep. 5, 2011 (KR) .......................... 10-2011-0089746

(51) Int. Cl.
*H02J 7/04* (2006.01)
*H02J 7/00* (2006.01)

(52) U.S. Cl.
CPC ......... *H02J 7/0068* (2013.01); *H02J 7/04* (2013.01)
USPC .............................. 320/162; 324/426; 324/433

(58) Field of Classification Search
USPC ........ 320/162; 324/426, 433; 340/455, 636.1, 340/636.12, 636.15, 636.19, 636.2
See application file for complete search history.

(56) References Cited

U.S. PATENT DOCUMENTS

| | | | |
|---|---|---|---|
| 5,606,242 A * | 2/1997 | Hull et al. | 320/106 |
| 6,691,049 B1 * | 2/2004 | Jeansonne et al. | 702/63 |
| 7,962,661 B2 * | 6/2011 | Robertson et al. | 710/9 |
| 8,350,529 B2 * | 1/2013 | Loncarevic | 320/122 |
| 2009/0146610 A1 | 6/2009 | Trigiani | |
| 2011/0175574 A1 * | 7/2011 | Sim et al. | 320/121 |

FOREIGN PATENT DOCUMENTS

| | | |
|---|---|---|
| JP | 11-214166 A | 8/1999 |
| JP | 2002-110259 A | 4/2002 |
| JP | 2005-51507 A | 2/2005 |
| JP | 2008-99482 A | 4/2008 |
| JP | 2010-245860 A | 10/2010 |
| KR | 10-0389890 B1 | 9/2003 |
| KR | 10-2010-0098550 A | 9/2010 |
| KR | 10-2011-0031747 A | 2/2011 |

OTHER PUBLICATIONS

International Search Report, issued in PCT/KR2012/007129, dated Feb. 27, 2013.

* cited by examiner

*Primary Examiner* — Richard V Muralidar
(74) *Attorney, Agent, or Firm* — Birch, Stewart, Kolasch & Birch, LLP

(57) ABSTRACT

Disclosed is a method and system for allocating identifiers to multi-slaves in a battery pack. The method for allocating identifiers, in which a master battery management system (BMS) allocates identifiers to N (N is an integer of 2 or above) number of slave BMSs through a communication network, includes (a) by each slave BMS, generating an initial identifier by combining digital voltage measurement values of battery cells included in a battery module managed by the slave BMS and transmitting the initial identifier to a master BMS; and (b) by the master BMS, allocating identifiers again according to the initial identifier received from each slave BMS and then transmitting the identifiers to slave BMSs. Therefore, it is possible to allocate identifiers without inputting an identifier to a multi-slave BMS in advance or using a separate hardware configuration.

12 Claims, 3 Drawing Sheets

METHOD AND SYSTEM FOR ALLOCATING IDENTIFIERS TO MULTI-SLAVE IN BATTERY PACK

CROSS-REFERENCE TO RELATED APPLICATION

The present application is a continuation of International Application No. PCT/KR2012/007129 filed On Sep. 5, 2012, which claims priority to Korean Patent Application No. 10-2011-0089746 filed in the Republic of Korea on Sep. 5, 2011, the disclosures of which are incorporated herein by reference.

TECHNICAL FIELD

The present disclosure relates to a method and system for setting an identifier to each slave in a battery management system (BMS) of a multi-slave structure, which is applied to a battery pack having a multi battery structure, and more particularly, to a method and system for allocating or setting an identifier by using a combination of digital voltage measurement values of battery cells included in a battery module.

BACKGROUND ART

Secondary batteries have high applicability depending on the product group and excellent electrical characteristics such as high energy density, and thus are commonly being used as electric power sources of electric vehicles (EVs) or hybrid vehicles (HVs) as well as mobile devices. These secondary batteries have a primary advantage of greatly reducing the use of fossil fuels. Also, secondary batteries do not generate by-products that come with the energy consumption, and thus are environmentally friendly and can improve the energy efficiency. For these reasons, secondary batteries are gaining attention as alternative energy sources.

Generally, a battery pack for EVs includes an assembly made up of a plurality of batteries (cells) or a plurality of assemblies. The cell has a cathode current collector, a separator, an active material, an electrolyte, an aluminum thin-film layer, and the like, and can be charged and discharged by electrochemical reactions between these components or elements.

In addition to the basic structure above, the battery pack further includes a battery management system (BMS) to manage the batteries by monitoring the state of the batteries and controlling the environment of the batteries using algorithms for controlling the power supply based on a driving load of a motor, measuring the electrical properties such as current or voltage, controlling the charge/discharge, equalizing the voltage, estimating the state of charge (SOC), and the like.

Recently, there is an increasing need for a battery pack as high capacity applications as well as energy storage applications. To meet the need, a multi-module battery pack having a plurality of batteries connected in series/parallel is generally dominant.

This multi-structure battery pack may be implemented variously depending on the type of a logic circuit or printed circuit board (PCB). For example, to improve the monitoring and control efficiency, the multi-structure battery pack may comprise a multi-slave BMS including a plurality of slave BMSs to respectively manage a plurality of batteries constituting the battery pack and a main or master BMS for integrated control of a plurality of the slave BMSs.

In this instance, the master BMS communicates with the slave BMSs to collect data of the batteries managed by the slave BMSs that will be used in checking the current state of the batteries and controlling the charge/discharge of the batteries.

To collect data or transmit a command signal, a node identifier (ID) of each slave BMS is necessarily required. Conventionally, an ID is preset on a circuit or programmed in an electrically erasable programmable read-only memory (EEPROM) and the like, for each slave BMS.

Since this conventional method needs mechanisms for operating individual hardware or software as many as the number of slave BMSs included in the battery pack and must manage the mechanisms, it occupies a lot of resources and has a complex operating scheme.

DISCLOSURE

Technical Problem

The present disclosure is designed to solve the problems of the related art, and therefore the present disclosure is directed to providing a method and system capable of allocating an identifier without inputting an identifier to a multi-slave BMS in advance or using a separate hardware configuration.

Technical Solution

In one aspect of the present disclosure, there is provided a method for allocating identifiers, in which a master battery management system (BMS) allocates identifiers to N (N is an integer of 2 or above) number of slave BMSs through a communication network, the method including: (a) by each slave BMS, generating an initial identifier by combining digital voltage measurement values of battery cells included in a battery module managed by the slave BMS and transmitting the initial identifier to a master BMS; and (b) by the master BMS, allocating identifiers again according to the initial identifier received from each slave BMS and then transmitting the identifiers to slave BMSs.

In another aspect of the present disclosure, there is also provided a system for allocating identifiers, which includes N number of slave BMSs, each of which generates an initial identifier by combining digital voltage measurement values of battery cells included in a battery module managed by the slave BMS and transmits the initial identifier to a master BMS through a communication network; and a master BMS for allocating identifiers again according to the initial identifier received from each slave BMS and then transmitting the identifiers to the slave BMSs through the communication network.

Advantageous Effects

According to an aspect of the present disclosure, it is possible to allocate an identifier without inputting an identifier to a multi-slave BMS in advance or using a separate hardware configuration.

According to another aspect of the present disclosure, since an additional process for inputting an identifier to a multi-slave BMS in advance or using a separate hardware configuration is not required, it is possible to improve productivity by shortening its process time and reducing production costs. In addition, since a battery pack may also be configured by using a slave BMS prepared under the same condition, the production line may be further simplified.

According to another aspect of the present disclosure, since an initial identifier is generated by combining digital voltage measurement values, the occurrence probability of initial identifiers overlapping is low. Therefore, even though a part of the slave BMS is exchanged with a new one or a slave BMS to which an identifier is already endowed is newly mounted, it is possible to prevent identifiers from overlapping, thereby enhancing adaptability when expanding or installing equipment and also improving product reliability.

According to another aspect of the present disclosure, even when a slave BMS in a battery pack is exchanged with a new one, a worker need not have to check identifiers of slave BMSs one by one, thereby greatly improving the work efficiency when it comes to exchanging the battery pack or the like and minimizing or preventing a system error caused by erroneous mounting.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings in which.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

First, a method for allocating identifiers according to an embodiment of the present disclosure will be described.

Prior to describing the method for allocating identifiers, components of a battery pack according to an embodiment of the present disclosure will be described.

Figure 1:
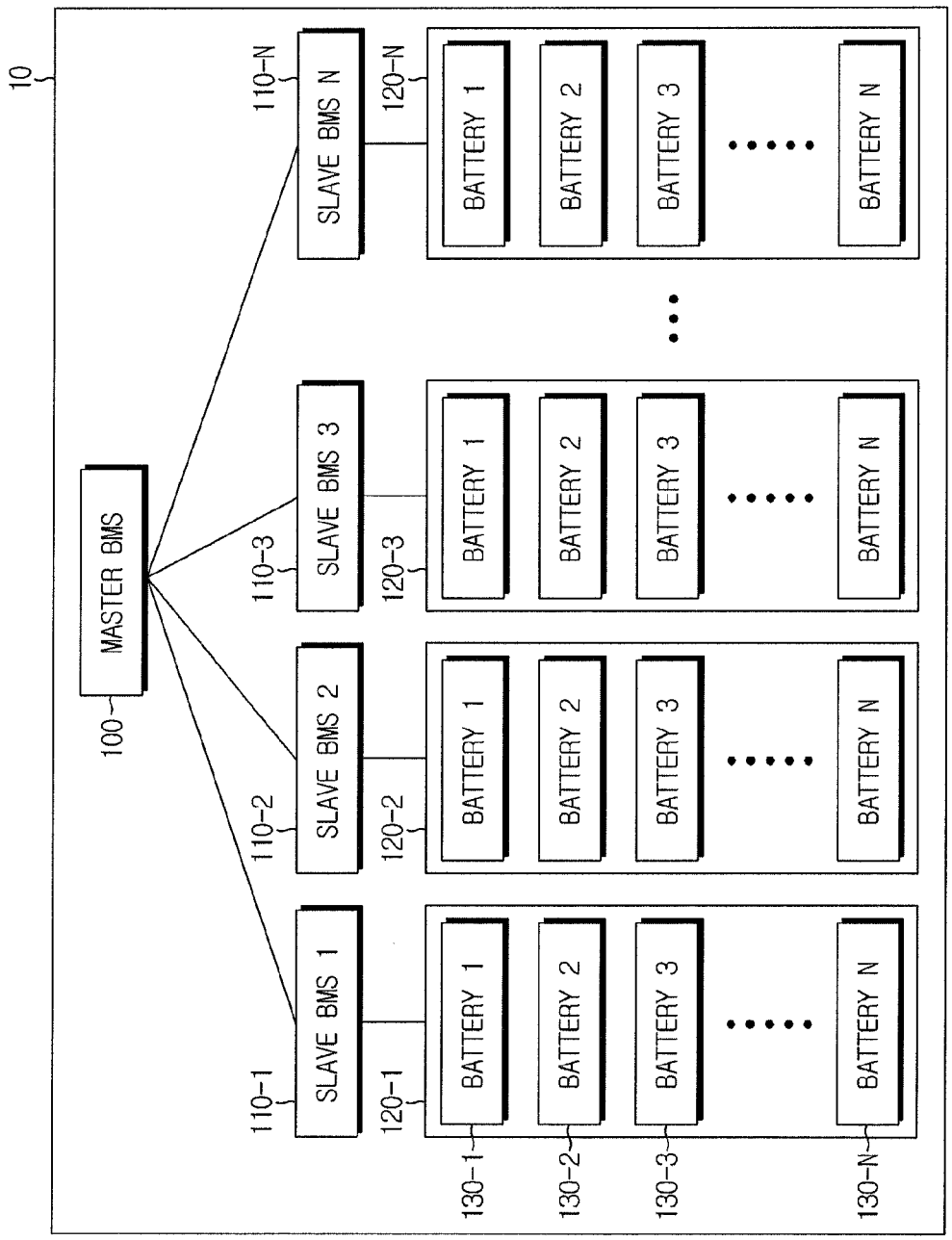
FIG. 1 is a block diagram showing an overall configuration of a battery pack having a multi-slave structure according to an embodiment of the present disclosure.

FIG. 1 is a block diagram showing an overall configuration of a battery pack having a multi-slave structure according to an embodiment of the present disclosure;

Referring to FIG. 1, a battery pack 10 having a multi-slave structure includes a master BMS 100, a slave BMS 110, a plurality of battery cells 130 included in the slave BMS and a battery module 120 including the same.

The master BMS 100 corresponds to a BMS for integrated control of the plurality of slave BMSs 110 and is connected to a communication network to request or receive required information by communication with each slave BMS 110.

Each of the slave BMSs 110-1, 110-2, . . . , 110-N is electrically connected to battery modules 120-1, 120-2, . . . , 120-N handled by the slave BMS and controls the corresponding battery modules 120-1, 120-2, . . . , 120-N, namely at least one battery cell 130-1, 130-2, . . . , 130-N. The control function of the slave BMS 110 may include various electric or electronic control functions, applicable at the level of persons skilled in the art, such as charging/discharging control, smoothing control, switching, electric characteristic measuring and monitoring, error signing, ON/OFF control or the like.

In the battery pack 10 having a multi-slave structure as shown in FIG. 1, the plurality of slave BMSs 110-1, 110-2, . . . , 110-N may be located to have a physically sequential order.

Preferably, the communication network is a controller area network (CAN). The CAN is well known in the art of the present disclosure and is not described in detail here.

A method for allocating identifiers by using the components of the battery pack 10 will be described below with reference to FIGS. 2 and 3.

Figure 2:
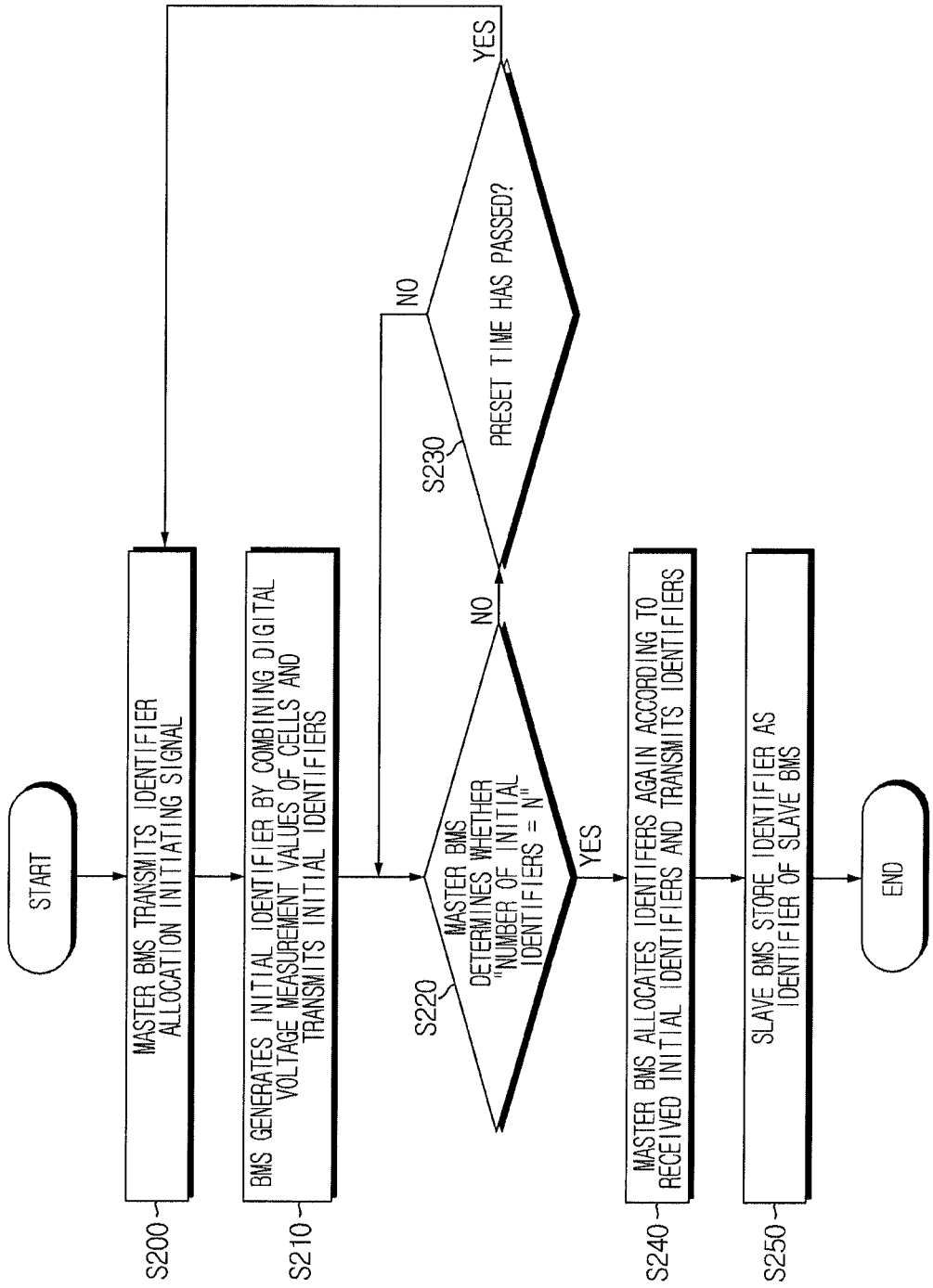
FIG. 2 is a flowchart for illustrating a method for allocating identifiers according to an embodiment of the present disclosure.

FIG. 2 is a flowchart for illustrating a method for allocating identifiers according to an embodiment of the present disclosure.

First, in Step S200, if it is determined that identifiers should be newly set or should be inspected or checked, or according to a periodic checking schedule, the master BMS 100 of the present disclosure transmits an identifier allocation initiating signal to the slave BMSs 110-1, 110-2, . . . , 110-N through the communication network. At this time, the identifier allocation initiating signal notifies that the process for allocating identifiers to the slave BMSs 110-1, 110-2, . . . , 110-N is initiated.

Next, in Step S210, each of the slave BMSs 110-1, 110-2, . . . , 110-N receiving the identifier allocation initiating signal measures voltages of battery cells 130-1, 130-2, . . . , 130-N in battery modules 120-1, 120-2, . . . , 120-N handled by the corresponding slave BMS. The measured voltages of the battery cells 130-1, 130-2, . . . , 130-N are converted into digital voltage measurement values by means of Analog to Digital (A/D) conversion. Each of the slave BMSs 110-1, 110-2, . . . , 110-N combines the digital voltage measurement values to generate an initial identifier.

Preferably, each of the slave BMSs 110-1, 110-2, . . . , 110-N generates the initial identifier by combining at least one bit selected from a lower bit region among the digital voltage measurement values.

More preferably, each of the slave BMSs 110-1, 110-2, . . . , 110-N generates the initial identifier by combining one lowest bit or two lowest bits among the digital voltage measurement values.

The initial identifier is an identifier temporarily used before an identifier is identified. At this time, N number of initial identifiers should not overlap with each other, and therefore the present disclosure generates a random sampling number by using uncertainty inherent in the battery cell 130.

Figure 3:
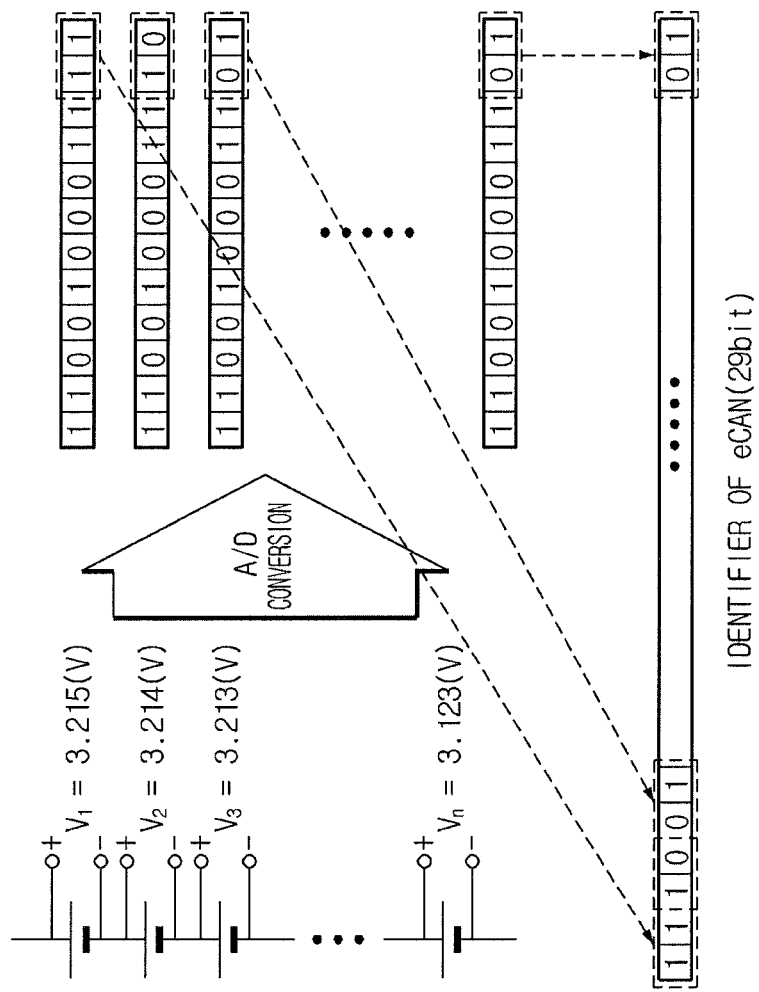
FIG. 3 shows an example of a process for generating an initial identifier by combining digital voltage values according to an embodiment of the present disclosure.

With reference to FIG. 3, a method for the slave BMS 110 to generate an initial identifier will be described.

FIG. 3 shows an example of a process for generating an initial identifier by combining digital voltage values according to an embodiment of the present disclosure.

Referring to FIG. 3, it is depicted that 29 bit initial identifiers of an eCAN are generated by using two lowest bits. If voltages of the battery cells 130-1, 130-2, . . . , 130-N are measured as 3.125 (V), 3.124 (V), 3.123 (V), . . . , 3.123 (V), these voltages may be converted into binary numbers by means of A/D conversion and expressed as 110010001<u>11</u> (2), 110010001<u>10</u> (2), 110010001<u>01</u> (2), . . . , 1100100011

01 (2). At this time, an initial identifier of 111001...01 (2) is generated by combining two lowest bits of the digital voltage measurement values.

The digital voltage measurement values of the battery cells 130-1, 130-2, ..., 130-N include uncertainty such as voltage fluctuation, measurement noise, quantization error or the like. At this time, more diversity is endowed to a digital voltage measurement value having a lower bit, expressed as a binary number. Therefore, when an initial identifier is generated by combining at least one selected from a lower bit region of the digital voltage measurement values, N number of initial identifiers not overlapping with each other may be generated.

The lower bit for generating the initial identifier may be set in various ways by considering the number of battery modules 120 in the battery pack 10, the number of battery cells 130 in the battery module 120, the probability of initial identifiers overlapping, or the like.

The slave BMSs 110-1, 110-2, ..., 110-N transmit the generated initial identifiers to the master BMS 110. Preferably, the slave BMSs 110-1, 110-2, ..., 110-N are set to transmit the initial identifier in ascending order of values of the generated initial identifiers. For example, in case of communication using a controller area network (CAN), a BUS communication network composed of two twisted lines is used. The slave BMSs 110-1, 110-2, ..., 110-N simultaneously transmit the initial identifiers to the CAN, and if any slave BMS determines that its identifier is higher than another identifier, the corresponding slave BMS stops the transmission. The corresponding slave BMS attempts re-transmission of the initial identifier, and as a result, an identifier having a highest initial identifier value is transmitted last. Arrangement of transmission order according to identifier values in a communication network is well known in the art of the present disclosure and is not described in detail here.

Next, in Step S220, the master BMS 100 determines whether N number of initial identifiers is received from the slave BMSs 110-1, 110-2, ..., 110-N.

Preferably, if N number of initial identifiers is not received in Step S220, the master BMS 110 determines whether a preset time has passed. If the preset time has not passed, the master BMS 110 keeps waiting to receive an initial identifier. However, if N number of initial identifiers is not received within the preset time, the process returns to Step S200 so that the master BMS 100 transmits an identifier allocation initiating signal again to each of the slave BMSs 110-1, 110-2, ..., 110-N.

Due to the uncertainty included in the digital voltage measurement values, the probability that the initial identifiers overlap with each other is very low, but not impossible. Therefore, if the generated initial identifiers for different slave BMSs 110-1, 110-2, ..., 110-N overlap with each other, the master BMS does not receive N number of initial identifiers within the preset time. At this time, the master BMS determines that initial identifiers overlap with each other and transmits the identifier allocation initiating signal again to each of the slave BMSs 110-1, 110-2, ..., 110-N.

The preset time for receiving initial identifiers may be selected in various ways according to the number of slave BMSs 110, the performance of the slave BMSs 110 or a communication rate of the network.

If the master slave 100 receives N number of initial identifiers in Step S220, the process proceeds to Step S240.

In Step S240, the master BMS 100 allocates the identifiers again according to the received initial identifiers and then transmits the identifiers to the slave BMSs 110-1, 110-2, ..., 110-N. In addition, each of the slave BMSs 110-1, 110-2, ..., 110-N stores the received identifier as its identifier.

Preferably, the master BMS 100 allocates identifiers of the slave BMSs 110-1, 110-2, ..., 110-N in ascending order of values of the received initial identifiers and then transmits the identifiers to the slave BMSs.

Hereinafter, a system for allocating identifiers according to an embodiment of the present disclosure will be described based on the embodiment described above. However, the configuration of the battery pack (for example, the battery cell, the battery module and the communication network), the initial identifier producing method, the initial identifier transmission order and the method for allocating identifiers, which have been described above, will not be explained in detail here.

The system for allocating identifiers according to an embodiment of the present disclosure includes N (N is an integer of 2 or above) number of slave BMSs 110-1, 110-2, ..., 110-N and a master BMS 100.

Each of the slave BMSs 110-1, 110-2, ..., 110-N generates an initial identifier by combining digital voltage measurement values of battery cells included in a battery pack handled by the corresponding slave BMS, and transmits the initial identifier through a communication network.

Preferably, each of the slave BMSs 110-1, 110-2, ..., 110-N generates the initial identifier by combining at least one bit selected from a lower bit region among the digital voltage measurement values of battery cells included in a battery pack handled by the corresponding slave BMS.

More preferably, each of the slave BMSs 110-1, 110-2, ..., 110-N generates the initial identifier by combining one lowest bit or two lowest bits among the digital voltage measurement values of battery cells included in a battery pack handled by the corresponding slave BMS.

Also preferably, the slave BMSs 110-1, 110-2, ..., 110-N transmit the initial identifier to the master BMS in ascending order of values of the initial identifiers.

The master BMS 100 allocates the identifiers again according to the initial identifiers received from the slave BMSs 110-1, 110-2, ..., 110-N and then transmits the identifiers to the slave BMSs 110-1, 110-2, ..., 110-N through the communication network.

Preferably, if the master BMS 100 does not receive N number of initial identifiers from the slave BMSs 110-1, 110-2, ..., 110-N within a preset time, the master BMS 100 receives initial identifiers again from the slave BMSs 110-1, 110-2, ..., 110-N.

Also preferably, the master BMS 100 allocates identifiers again in ascending order of values of the initial identifiers received from the slave BMSs 110-1, 110-2, ..., 110-N and then transmits the identifiers to the slave BMSs 110-1, 110-2, ..., 110-N.

Preferably, the communication network is a controller area network (CAN).

According to an aspect of the present disclosure, it is possible to allocate an identifier without inputting an identifier to a multi-slave BMS in advance or using a separate hardware configuration. In addition, since an additional process for inputting an identifier to a multi-slave BMS in advance or using a separate hardware configuration is not required, it is possible to improve productivity by shortening its process time and reducing production costs. In addition, since a battery pack may also be configured by using a slave BMS prepared under the same condition, the production line may be further simplified. Moreover, since an initial identifier is generated by combining digital voltage measurement values, the occurrence probability of initial identifiers overlapping is low. Therefore, even though a part of the slave BMS is exchanged with a new one or a slave BMS to which an identifier is already endowed is newly mounted, it is possible to prevent identifiers from overlapping, thereby enhancing adaptability when expanding or installing equipment and also improving product reliability. Further, even when a slave BMS in a battery pack is exchanged with a new one, a worker may not necessarily check identifiers of slave BMSs one by one, thereby greatly improving the work efficiency when it comes to exchanging the battery pack or the like and minimizing or preventing a system error caused by erroneous mounting.

Meanwhile, it should be understood that the components or elements of the battery pack 10 of the present disclosure shown in FIG. 1 may not be physically but rather logically distinguished therebetween.

In other words, it should be interpreted that since each component or element of the battery pack according to the present invention is a logic component or element, they fall within the spirit or scope of the invention if they perform a function of a logic feature of the present invention whether they operate separately or integratedly, and even though they are named otherwise, they fall within the spirit or scope of the invention if they perform the same or similar function.

What is claimed is:

1. A method for allocating identifiers, in which a master battery management system (BMS) allocates identifiers to N (N is an integer of 2 or above) number of slave BMSs through a communication network, the method comprising:
   (a) by each slave BMS, generating an initial identifier by combining at least one bit selected from a lower bit region among digital voltage measurement values of battery cells included in a battery module managed by the slave BMS and transmitting the initial identifier to a master BMS; and
   (b) by the master BMS, allocating identifiers again according to the initial identifier received from each slave BMS and then transmitting the identifiers to slave BMSs.

2. The method for allocating identifiers according to claim 1,
   wherein in the step (a), each slave BMS generates an initial identifier by combining one lowest bit or two lowest bits among the digital voltage measurement values of the battery cells included in the battery module managed by the slave BMS.

3. The method for allocating identifiers according to claim 1,
   wherein in the step (a), the slave BMSs transmit the initial identifiers to the master BMS in ascending order of values of the initial identifiers.

4. The method for allocating identifiers according to claim 1, further comprising:
   in the case the master BMS does not receive N number of initial identifiers from the slave BMSs within a preset time, by the master BMS, receiving an initial identifier again from each slave BMS.

5. The method for allocating identifiers according to claim 1,
   wherein in the step (b), the master BMS allocates identifiers again in ascending order of values of the initial identifiers received from the slave BMSs and then transmits the identifiers to the slave BMSs.

6. The method for allocating identifiers according to claim 1,
   wherein in the step (a), the communication network is a controller area network (CAN).

7. A system for allocating identifiers, comprising:
   N number of slave BMSs, each of which generates an initial identifier by combining at least one bit selected from a lower bit region among digital voltage measurement values of battery cells included in a battery module managed by the slave BMS and transmits the initial identifier to a master BMS through a communication network; and
   a master BMS for allocating identifiers again according to the initial identifier received from each slave BMS and then transmitting the identifiers to the slave BMSs through the communication network.

8. The system for allocating identifiers according to claim 7,
   wherein each slave BMS generates an initial identifier by combining one lowest bit or two lowest bits among the digital voltage measurement values of the battery cells included in the battery module managed by the slave BMS.

9. The system for allocating identifiers according to claim 7,
   wherein the slave BMSs transmit the initial identifiers to the master BMS in ascending order of values of the initial identifiers.

10. The system for allocating identifiers according to claim 7,
    wherein in the case the master BMS does not receive N number of initial identifiers from the slave BMSs within a preset time, the master BMS receives an initial identifier again from each slave BMS.

11. The system for allocating identifiers according to claim 7,
    wherein the master BMS allocates identifiers again in ascending order of values of the initial identifiers received from the slave BMSs and then transmits the identifiers to the slave BMSs.

12. The system for allocating identifiers according to claim 7,
    wherein the communication network is a controller area network (CAN).

* * * * *